(12) United States Patent
Osanai et al.

(10) Patent No.: US 7,346,624 B2
(45) Date of Patent: Mar. 18, 2008

(54) SYSTEMS AND METHODS FOR PROCESSING BUFFER DATA RETIREMENT CONDITIONS

(75) Inventors: Takeki Osanai, Austin, TX (US); Brian D. Barrick, Pflugerville, TX (US)

(73) Assignees: Kabushiki Kaisha Toshiba, Tokyo (JP); International Business Machines Corporation, Armonk, NY (US)

( * ) Notice: Subject to any disclaimer, the term of this patent is extended or adjusted under 35 U.S.C. 154(b) by 437 days.

(21) Appl. No.: 10/919,100

(22) Filed: Aug. 16, 2004

(65) Prior Publication Data

US 2006/0036638 A1    Feb. 16, 2006

(51) Int. Cl.
*G06F 17/30* (2006.01)

(52) U.S. Cl. .................................... 707/102

(58) Field of Classification Search ............... 707/1, 707/2, 9, 10, 200, 102; 709/224
See application file for complete search history.

(56) References Cited

U.S. PATENT DOCUMENTS

| | | | |
|---|---|---|---|
| 4,437,149 A | 3/1984 | Pomerene | |
| 6,367,006 B1 * | 4/2002 | Tran | 712/244 |
| 6,968,556 B1 * | 11/2005 | Caron et al. | 719/318 |
| 2004/0133432 A1 * | 7/2004 | Sugumar et al. | 705/1 |

* cited by examiner

*Primary Examiner*—Etienne Leroux
(74) *Attorney, Agent, or Firm*—Law Offices of Mark L. Berrier

(57) ABSTRACT

A system and method for determining whether to retire a data entry from a buffer. A portion of the retirement conditions is processed prior to the data entry being considered for retirement resulting in faster processing of remaining retirement conditions at the time retirement of the data is to be considered. The results from the pre-processing are stored as predecoded retirement information, which is later used with the remaining retirement conditions to determine whether the data is to be retired from the buffer.

26 Claims, 9 Drawing Sheets

SYSTEMS AND METHODS FOR PROCESSING BUFFER DATA RETIREMENT CONDITIONS

BACKGROUND OF THE INVENTION

1. Field of the Invention

The present invention relates generally to systems and methods for optimizing the processing of buffer data retirement conditions for data entries. More particularly, the present invention relates to systems and methods for processing at least a portion of the buffer data retirement conditions before the data entry is ready to be considered for retirement from the buffer, enabling faster and more efficient retirement of the data entry.

2. Related Art

Memory buffers—also referred to as queues—are often used in digital circuits. Memory buffers are temporary holding areas for data that is in transit from one device to another. Communicating devices often process data at different rates, and as a result, communication between these devices may be difficult and even impossible without intermediate buffers. If one device is ready to transmit data and the receiving device is not yet ready to receive the data, the data is stored temporarily in the buffer between the devices until the receiving device is ready to accept the data.

Memory buffers can facilitate communication between devices such as processors, RAM, hard disks, etc. Most keyboards have memory buffers for the temporary storage of keystrokes. Most printers have buffers for queuing the documents to be printed. Memory buffers can also be created for software programs by allocating a portion of the RAM of a computer system to act as a buffer to facilitate communication between a software program and the operating system, for example. Memory buffers can also exist between a software program and a device. A CD-writing program, for example, creates a memory buffer in RAM during the writing process to temporarily store data before writing the data to the CD.

Typically an entry is stored (registered) in the buffer and then removed (retired) if certain conditions are met. In very simple buffers—such as simple first-in-first-out queues (FIFOs)—data entries can be retired from the buffer after the data has been transmitted successfully to the receiving device. As digital circuits and devices become more complex, however, the number of conditions that must be met before a data entry can be retired from a buffer can significantly increase. For example, in complex multiprocessor systems, there can be ten or more conditions that must be met before a data entry can be retired from a processor's store or load queue.

To process the increasing number of retirement conditions, complex logic that is many levels deep is required. In addition, if it is determined by the logic that a data entry is to be retired, additional logic must generate multiple outputs whose purpose is to facilitate the retirement of the data. For example, the transferring of the data entry may require write requests to be made, pointers to be updated, counters to be incremented, etc. These additional requirements further increase the complexity of the logic.

It is typically desirable that a data entry retires from the queue with a certain frequency. It may be desirable, for example, to retire an entry every clock cycle. As the retirement logic becomes more complex, however, the time required to determine whether a data entry is to be retired increases. The retirement logic can therefore become a bottleneck, particularly in high-clock-frequency, high-performance systems that require queue entries to be retired each clock cycle.

There is therefore a need for systems and methods that can increase the efficiency of determining whether a data entry is to be retired from a buffer. The systems and methods should be able to process the retirement conditions efficiently and within the required time (which may be one cycle, for example) so that the performance of high-speed systems is not necessarily affected.

SUMMARY OF THE INVENTION

One or more of the problems outlined above may be solved by the various embodiments of the invention. Broadly speaking, the invention includes systems and methods for determining whether to retire a data entry from a buffer. A portion of the retirement conditions is evaluated prior to when the data entry is to be considered for retirement. As a result, the number of conditions that remain to be evaluated (and the time required for the evaluation) at the time when the data entry is to be considered for retirement significantly decreases allowing the retirement determination to be completed within the desired time (which may be, for example, one clock cycle).

According to one embodiment of the invention, a portion of the retirement conditions may be processed prior to the storing of the data entry into the buffer. The intermediate result may be stored as predecoded buffer data retirement condition data with the corresponding data entry in the buffer. In one embodiment, retirement conditions that will not (or are not expected to) change while the data entry is stored in the buffer are the conditions that are processed prior to storing the data entry into the buffer. By processing a portion of the retirement conditions before the data entry is stored into the buffer, the complexity of the logic (and corresponding number of levels of logic) required to process the remaining retirement conditions at the time the data entry is to be considered for retirement is significantly reduced.

In another embodiment, a portion of the retirement conditions may be evaluated while the data entry is advancing through the buffer. By preprocessing the retirement conditions in this manner, additional levels of complexity can be eliminated from the final retirement logic. The retirement conditions chosen to be processed while the data entry is pending in the buffer may be relatively static, or they may be conditions that were considered likely to change at the time the data entry was stored in the buffer but afterwards became unlikely to change.

An alternative embodiment of the invention comprises a buffer, predecode logic, and retire logic. The predecode logic is configured to receive information corresponding to a first set of retirement conditions for a data entry and to generate predecoded retirement information for the data entry based on this information. The retire logic is configured to receive the predecoded retirement information, as well as information corresponding to a second set of retirement conditions for the data entry. The retire logic is configured to determine whether to retire the data entry based on the predecoded retirement information and the additional information.

Another alternative embodiment of the invention comprises a method, including receiving information corresponding to a first set of retirement conditions for the data entry and generating predecoded retirement information for the data entry based on this information. The method further comprises receiving the predecoded retirement information and additional information corresponding to a second set of retirement conditions for the data entry and determining whether to retire the data entry based on the predecoded retirement information and the additional information.

Numerous additional embodiments are also possible.

The various embodiments of the present invention may provide a number of advantages over the prior art. Primarily, the time required to determine whether a data entry is to be retired can be significantly reduced thereby enabling the execution without interference of high-speed processors. Similar advantages may be provided in other embodiments involving other processes for evaluating retirement conditions prior to the time a data entry is to be considered for retirement.

BRIEF DESCRIPTION OF THE DRAWINGS

Other objects and advantages of the invention may become apparent upon reading the following detailed description and upon reference to the accompanying drawings.

Figure 1:
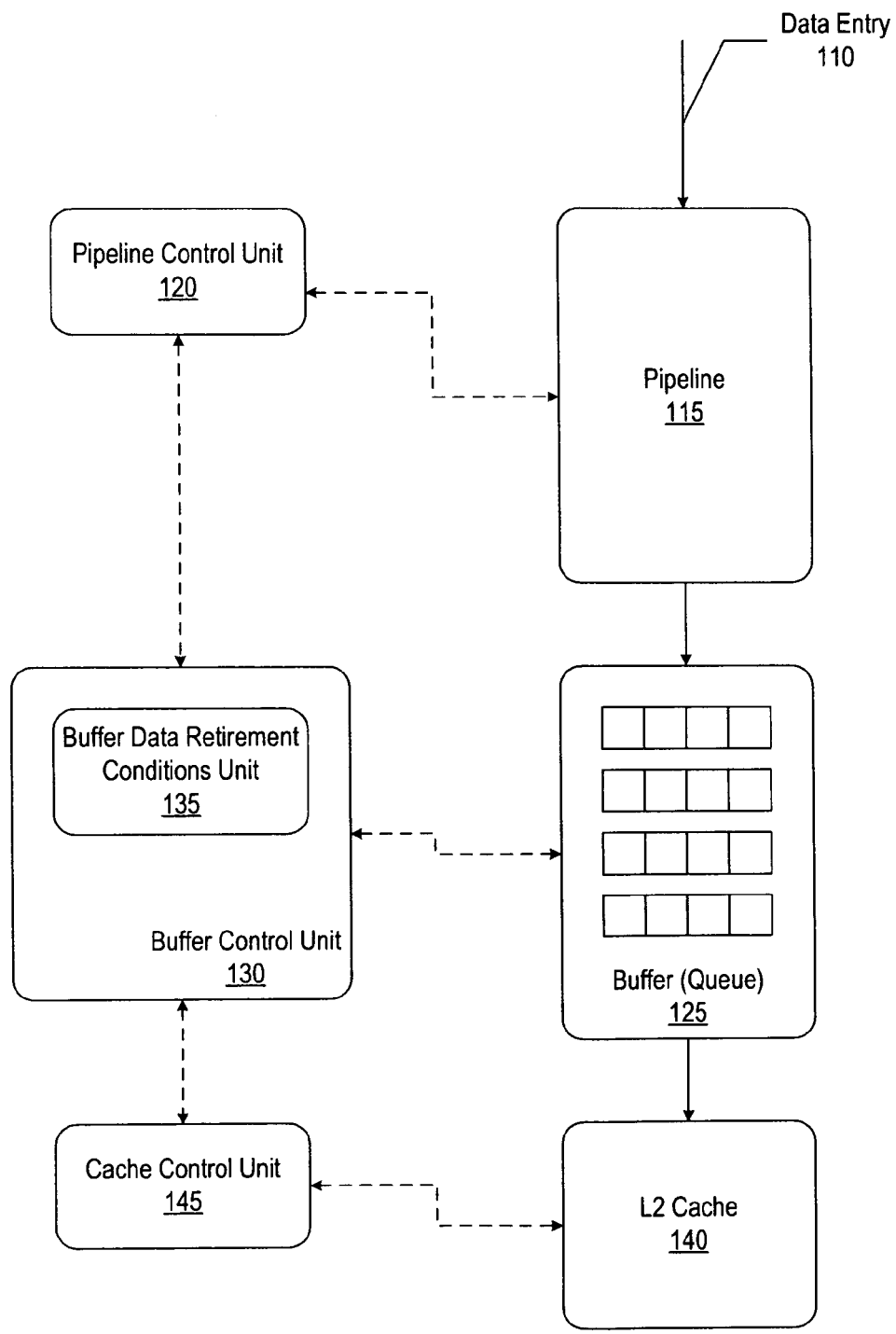
FIG. 1 is a block diagram illustrating a system configured to store data entries into a buffer and to retire the data entries from the buffer when the entries are ready for retirement in accordance with the prior art.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

One or more embodiments of the invention are described below. It should be noted that these and any other embodiments described below are exemplary and are intended to be illustrative of the invention rather than limiting.

Broadly speaking, the invention includes systems and methods for determining whether to retire a data entry from a buffer, where a portion of the retirement conditions is evaluated prior to the time at which the data entry is to be considered for retirement. As a result, the number of conditions that remain to be evaluated (and the time required for the evaluation) at the time when the data entry is to be retired significantly decreases, allowing the retirement determination to be completed within the desired time for high-speed systems (which may be, for example, one clock cycle).

According to one embodiment of the invention, a portion of the retirement conditions may be processed prior to the storing of the data entry into the buffer. The intermediate result may be stored as predecoded buffer data retirement condition data with the corresponding data entry in the buffer. In one embodiment, retirement conditions that will not (or are not expected to) change while the data entry is stored in the buffer are the conditions that are processed prior to storing the data entry into the buffer. By processing a portion of the retirement conditions before the data entry is stored into the buffer, the complexity of the logic (and corresponding number of levels of logic gates) required to process the remaining retirement conditions at the time the data entry is to be considered for retirement is significantly reduced.

In another embodiment, a portion of the retirement conditions may be evaluated while the data entry is advancing through the buffer. By preprocessing the retirement conditions in this manner, one or more levels of logic gates can be eliminated from the final retirement logic. The retirement conditions chosen to be processed while the data entry is pending in the buffer may be relatively static, or they may be conditions that were considered likely to change at the time the data entry was stored in the buffer but afterwards became unlikely to change.

The various embodiments of the present invention may provide a number of advantages over the prior art. Primarily, the time required to determine whether a data entry is to be retired can be significantly reduced thereby enabling the execution without interference of high-speed processors. Similar advantages may be provided in other embodiments involving other processes for evaluating retirement conditions prior to the time a data entry is to be considered for retirement.

Referring to FIG. 1, a block diagram illustrating a system configured to store data entries into a buffer and to retire the data entries from the buffer when the entries are ready for retirement in accordance with the prior art is shown. Buffer 125 is configured to provide an interface between a processor's pipeline 115 and L2 cache 140. In other embodiments, the buffer may provide an interface between two other types of devices. Pipeline 115 is configured to receive data, such as data entry 110, process the data, and store the processed data in buffer 125. Pipeline control unit 120, buffer control unit 130, and cache control unit 145 are configured to control pipeline 115, buffer 125, L2 cache 140 respectively as well as controlling the communication between these devices.

Each data entry stored in buffer 125 advances through the buffer until the data is being considered for retirement from buffer 125. Buffer data retirement conditions unit 135 is configured to determine, according to multiple retirement conditions, whether a data entry being considered for retirement can be retired. Buffer data retirement conditions unit 135 may be part of buffer control unit 130 or buffer data retirement conditions unit 135 may be a separate unit.

If buffer data retirement conditions unit 135 determines that a data entry in buffer 125 can be retired, buffer data retirement conditions unit 135 is configured to generate and output the appropriate signals required to facilitate the retirement of the data entry.

Figure 2:
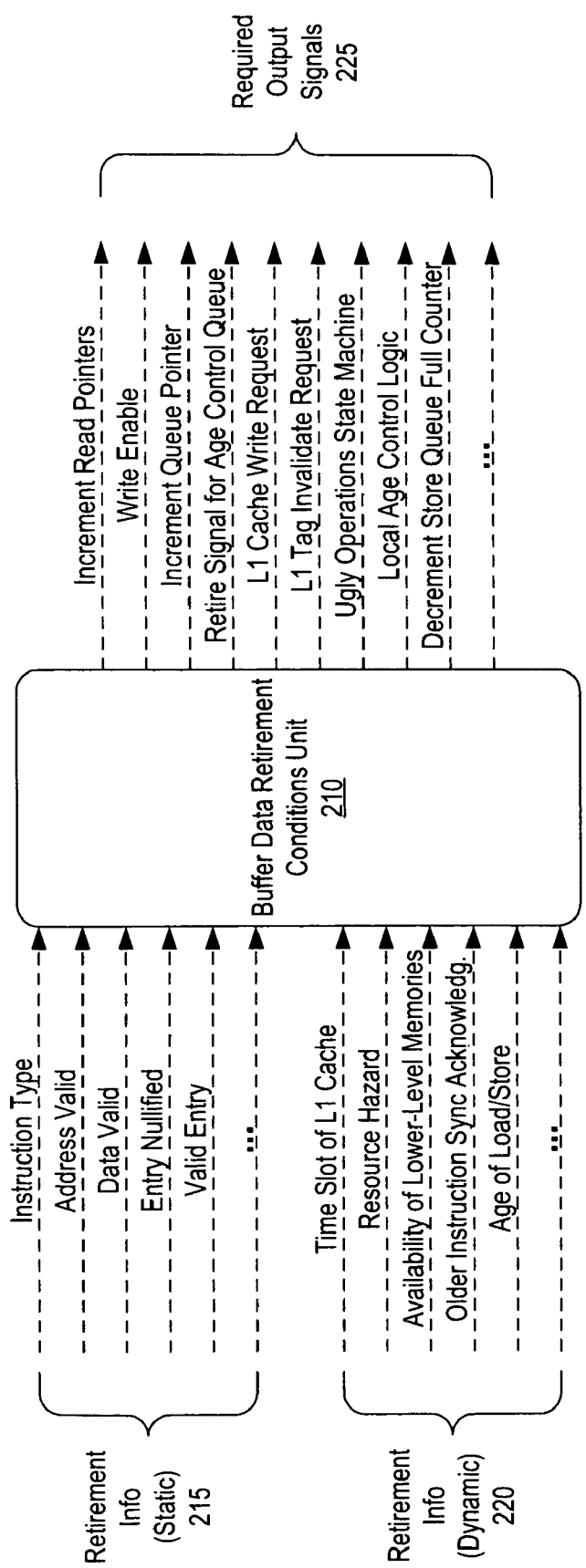
FIG. 2 is a block diagram illustrating a buffer data retirement condition unit configured to determine whether data entries can be retired from a buffer in accordance with the prior art.

Referring to FIG. 2, a block diagram illustrating a buffer data retirement conditions unit configured to determine whether data entries can be retired from a buffer in accordance with one embodiment is shown. Buffer data retirement conditions unit 210 is configured to receive multiple signals associated with data retirement information and to process those signals in order to determine whether a data entry being considered for retirement can be retired from the buffer. Buffer data retirement conditions unit 210 is configured to receive and process the retirement information when a data entry is being considered for retirement.

The retirement information being processed by buffer data retirement conditions unit 210 may include static retirement information 215 as well as dynamic retirement information 220. Static retirement information includes information that is very likely to remain unchanged after the data entry is stored into the buffer (such as whether the data is valid, whether the address is valid, etc.). Dynamic retirement information, on the other hand, includes information that is very likely to change while the data entry is propagating through the buffer (such as availability of lower-level memories, age of load/store, etc.). In this conventional system, all of the retirement information, regardless of whether it is static, dynamic, semi-dynamic, etc., is supplied to buffer data retirement conditions unit 210 when the data entry is being considered for retirement.

Buffer data retirement conditions unit 210 is further configured to generate required output signals 225 associated with data retirement from the buffer when the buffer data retirement conditions unit 210 determines the retirement conditions for a data entry have been met. Buffer data retirement conditions 210 may be configured, for example, to enable writes, modify pointers, increase counters, etc. to facilitate the retirement of the data entry.

Figure 3:
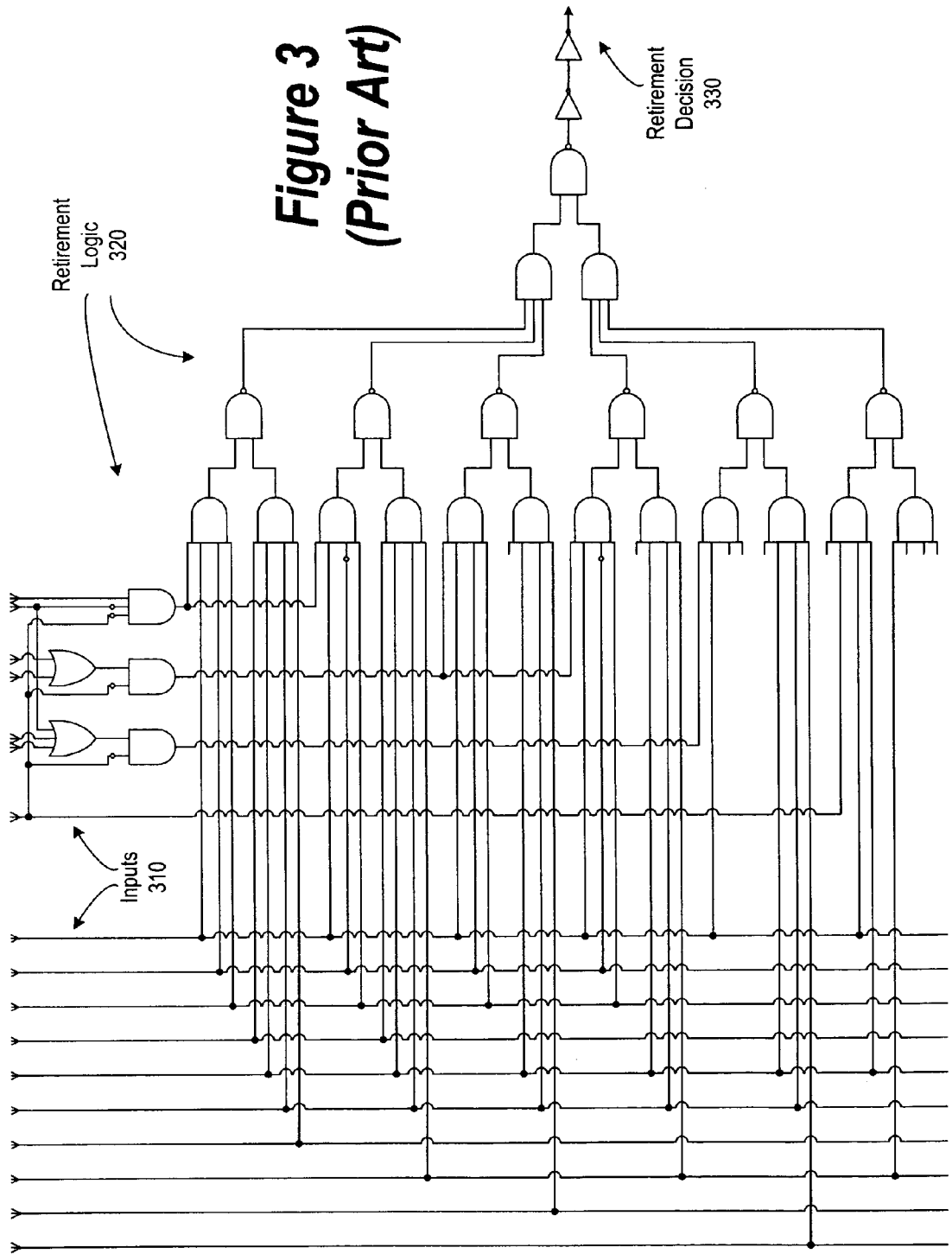
FIG. 3 is a block diagram illustrating the logic circuit of a buffer data retirement conditions unit in accordance with the prior art.

Referring to FIG. 3, a block diagram illustrating the logic circuit of a buffer data retirement conditions unit in accordance with the prior art is shown. The logic circuit is configured to receive signals from inputs 310, which represent the conditions that must be evaluated in order to determine whether to retire a data entry from the buffer.

Retirement logic 320 is configured to receive inputs 310 and, after processing the inputs through a series of logic gates, generate retirement decision 330. Retirement decision 330 represents a determination as to whether the data entry in the buffer should be retired. Due to the large number of inputs, a complicated circuit of logic gates is required.

Examples of inputs 310 may include: instruction type, data valid, entry nullified, address valid, page attribute, L1 cache hit, L1 cache time slot availability, L2 cache interface queue availability, entry age, sync operations acknowledgement, etc. In one embodiment, depending on the type of the instruction, a different set of logic conditions may be used to evaluate whether a data entry should be retired.

Figure 4:
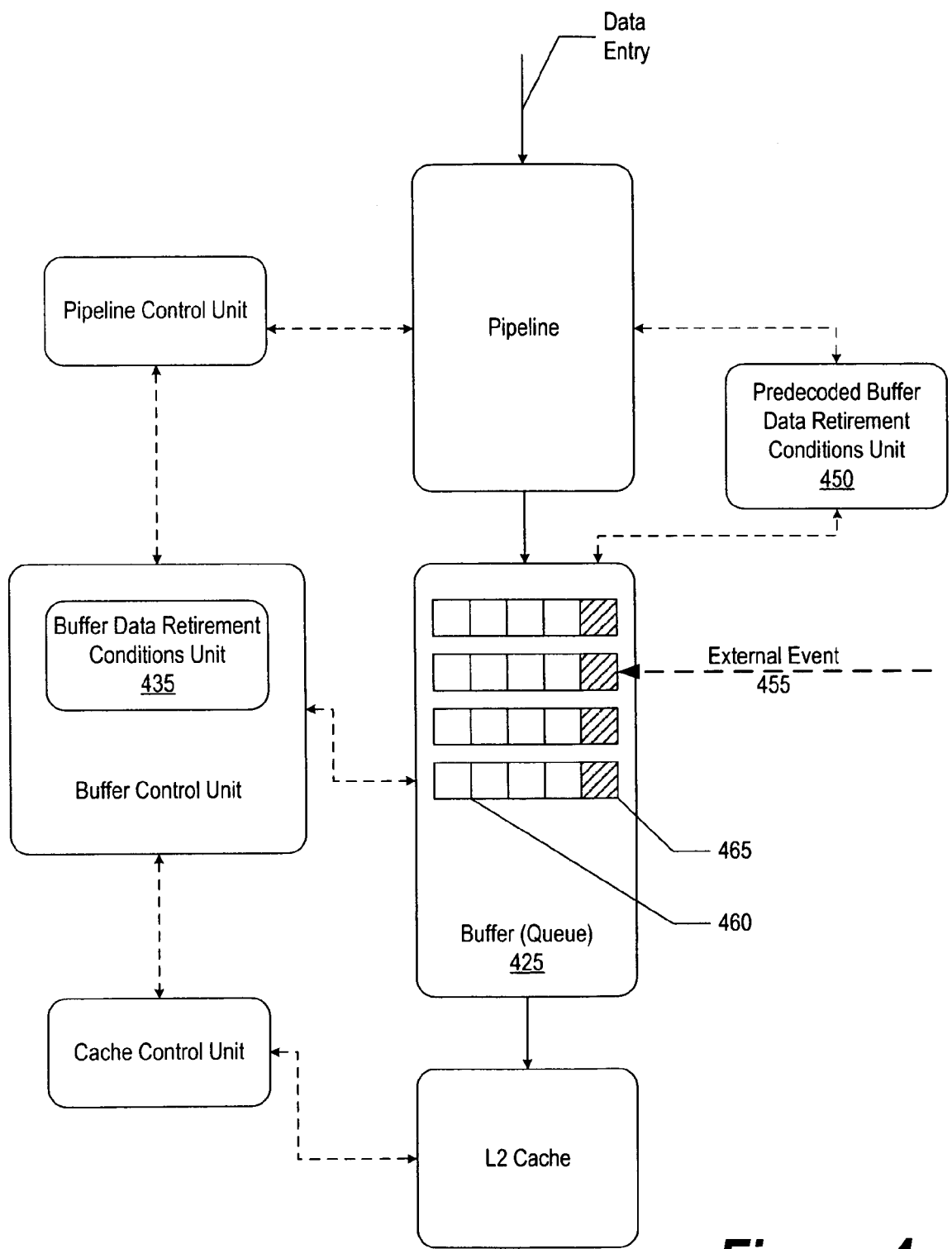
FIG. 4 is a block diagram illustrating a system configured to store data entries into a buffer and to store predecoded retirement data in the buffer with the corresponding data entries in accordance with one embodiment.

Referring to FIG. 4, a block diagram illustrating a system configured to store data entries into a buffer and to store predecoded retirement data in the buffer with the corresponding data entries in accordance with one embodiment is shown. This system is similar in structure to the system of FIG. 1. In order to reduce the time required to process data retirement conditions when a data entry is being considered for retirement at the end of buffer 425, however, an additional unit (predecoded buffer data retirement conditions unit 450) is introduced.

Predecoded buffer data retirement conditions unit 450 is configured to evaluate at least a portion of the retirement conditions associated with a data entry before the data entry is stored in buffer 425 from pipeline 415. In one embodiment, predecoded buffer data retirement conditions unit 450 is configured to receive retirement information that has low or no likelihood of changing after the data entry is stored in buffer 425.

Predecoded buffer data retirement conditions unit 450 is configured to generate predecoded retirement information corresponding to each data entry being stored in buffer 425. The predecoded retirement information is stored in buffer 425 with the corresponding data entry and is later read by buffer data retirement conditions unit 435 when the data entry is being considered for retirement. Buffer data retirement conditions unit 435 uses the predecoded retirement information along with additional retirement information to make a final determination as to whether a data entry is to be retired from buffer 425.

In the embodiment of FIG. 4, for example, each buffer entry includes data entry portion 460 for storing data entries and predecoded retirement information portion 465 for storing predecoded retirement information corresponding to the data entry. In other embodiments, the predecoded retirement information may be stored in other storage locations with information connecting the retirement information to the corresponding data entry.

While the retirement conditions on which the predecoded information is based are typically static, there may be situations in which the predecoded information must be changed. For example, it may be necessary to invalidate a data entry in the buffer to preserve cache coherence. Therefore, in one embodiment, the predecoded retirement information may be changed based on external event 455 even after the information has been stored in buffer 425.

Figure 5:
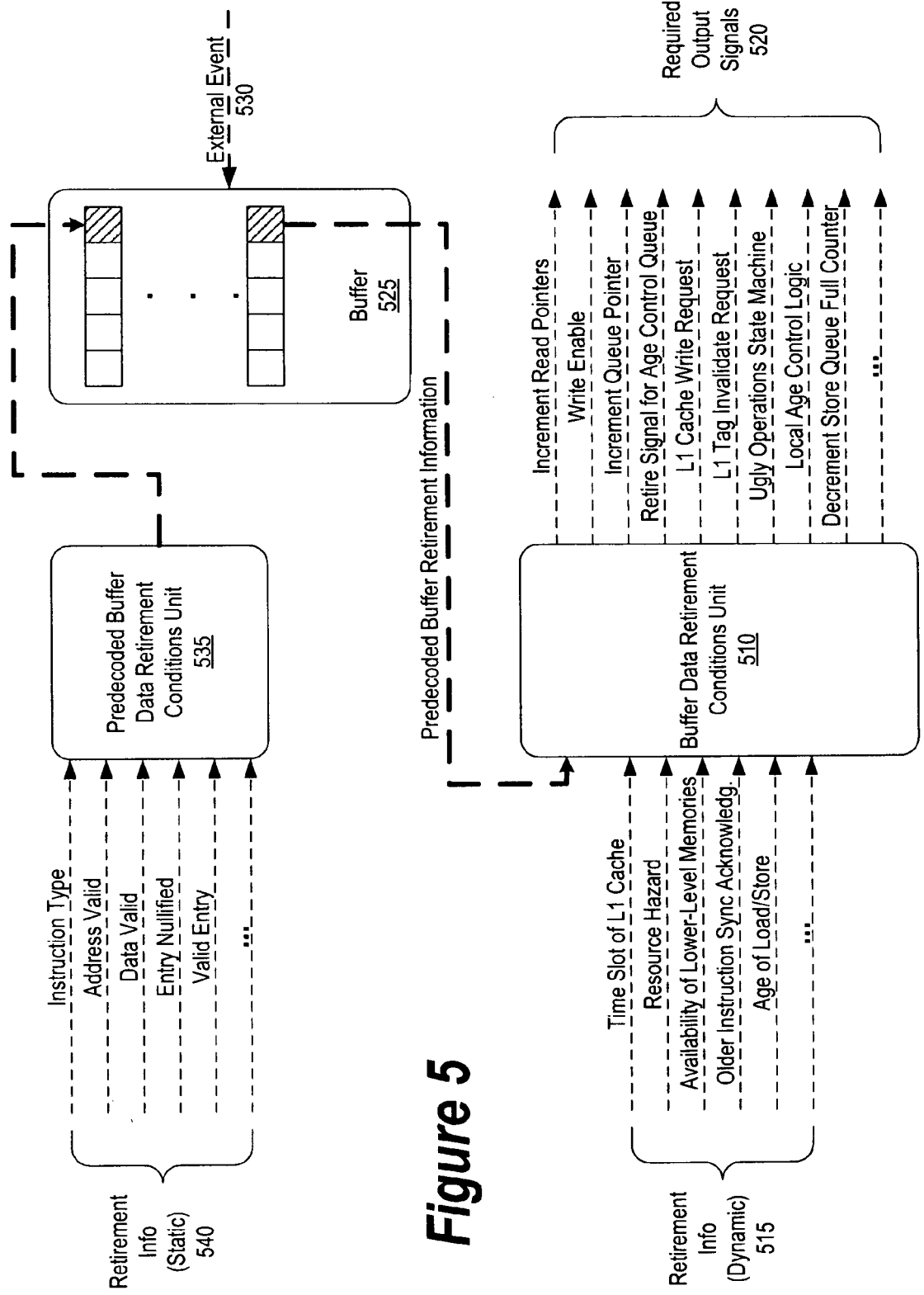
FIG. 5 is a block diagram illustrating a buffer data retirement conditions unit and a predecoded buffer data retirement conditions unit that are configured to determine whether data entries can be retired from a buffer in accordance with one embodiment.

Referring to FIG. 5, a block diagram illustrating a buffer data retirement conditions unit and predecoded buffer data retirement conditions unit that are configured to determine whether data entries can be retired from a buffer in accordance with one embodiment is shown. In one embodiment, predecoded buffer data retirement conditions unit 535 is configured to receive retirement information about a data entry having low or no likelihood of changing after the data entry has been stored in the buffer. Such information may include, for example, address validity information, data validity information, etc.

After receiving a portion of the retirement information, predecoded buffer data retirement conditions unit 535 is configured to generate predecoded retirement information and, in one embodiment, store that information in buffer 525 with the corresponding data entry.

When the data entry is ready to be retired, buffer data retirement conditions unit 510 is configured to receive the predecoded buffer retirement information, as well as any other remaining retirement information (such as dynamic retirement information), and to determine whether the data entry is to be retired. In addition, buffer data retirement conditions unit 510 is configured to generate output signals associated with the retirement of data entry such as enabling writes, incrementing pointers, incrementing counters, etc.

External events (such as external event 530) may modify the predecoded retirement information stored in the buffer with the data entries even while the information is propagating through the buffer (that is, after the data was stored in the buffer by predecoded buffer data retirement conditions unit 535).

In one embodiment, buffer 525 may be a store queue. For a store queue, information that may be used as static retirement data for predecoded buffer data retirement conditions 535 may include: whether the data is valid, the instruction type, whether the entry is nullified, the page attributes, whether the entry corresponds to a cache hit/miss, whether the address is valid, etc. External events that may modify the predecoded retirement data in a store queue may include: a snoop, a memory management unit (MMU) exception such as a translation lookaside buffer (TLB) page fault, a floating point unit storing late data, etc.

In another embodiment, buffer 525 may be a load miss queue. For a load miss queue, information that may be used as static retirement data for predecoded buffer data retirement conditions 535 may include: whether the data is valid, the instruction type, whether the entry is nullified, the page attributes, the reason the entry is pending, etc. External events that may modify the predecoded retirement data in a store queue may include: a snoop, a MMU exception such as a TLB page fault, a reload completion, a reason for pending elimination, etc.

In yet another embodiment, buffer 525 may be a buffer for accessing the L2 cache or other lower level caches or it may be a non-cache buffer. For such a buffer, information that may be used as static retirement data for predecoded buffer data retirement conditions 535 may include: whether the data is valid, the type of operation, whether the entry is nullified, the page attributes, whether the entry corresponds to a cache hit/miss, the reason the entry is pending, etc. External events that may modify the predecoded retirement data in this type of buffer may include: a snoop, a reload completion, a reason for pending elimination, a request to cancel memory access operation, etc.

In another alternative embodiment, buffer 525 may be a bus interface buffer for issuing bus operations. For a bus buffer, information that may be used as static retirement data for predecoded buffer data retirement conditions 535 may include: whether the data is valid, the bus command type, whether the entry is nullified, the page attributes, the reason the entry is pending, etc. External events that may modify the predecoded retirement data in a bus buffer may include: a snoop, a reason for pending elimination, a request to cancel bus operation, etc.

In another alternative embodiment, buffer 525 may be a buffer for issuing instructions such as a reservation station for an out-of-order processor. For a buffer for issuing instructions, information that may be used as static retirement data for predecoded buffer data retirement conditions 535 may include: whether the data is valid, the type of instruction, whether there are register dependencies (RAW, WAR, WAW), whether there are address dependencies between load/store instructions, the reason the entry is pending, etc. External events that may modify the predecoded retirement data in a buffer for issuing instructions may include: an instruction flush, resolution of register dependencies, resolution of address dependencies, instruction completion, etc.

Figure 6:
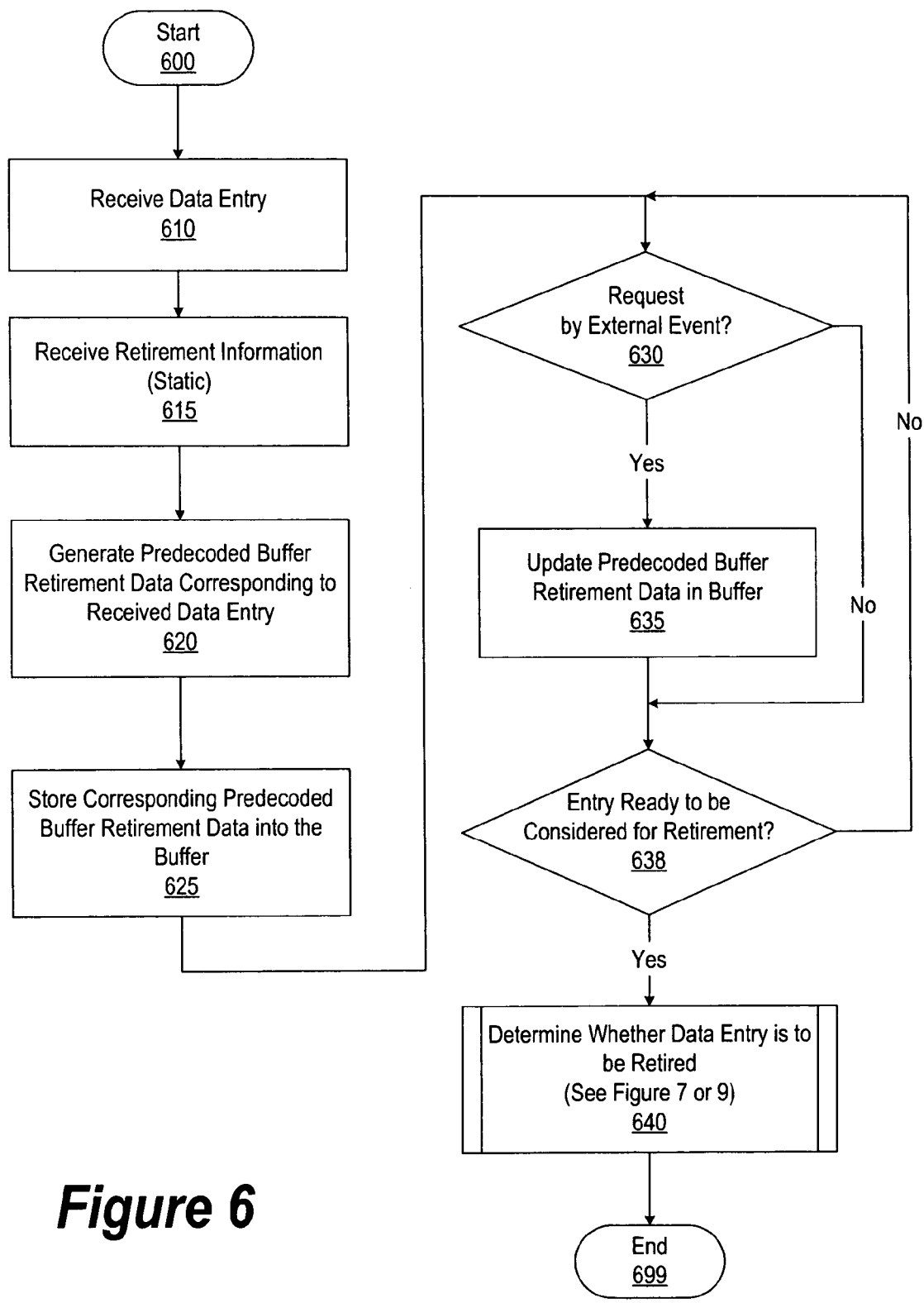
FIG. 6 is a flowchart illustrating a method for determining whether a data entry can be retired from a buffer in accordance with one embodiment.

Referring to FIG. 6, a flowchart illustrating a method for determining whether a data entry can be retired from a buffer in accordance with one embodiment is shown. Processing begins at 600 whereupon, at block 610, a data entry is received and stored in the buffer. In one embodiment, the data entry may be received from the pipeline of a processor and may be stored in the load or store queue (the buffer).

At block 615, predecoded retirement data corresponding to the received data entry is generated. In one embodiment, the predecoded retirement data may be based in part on retirement conditions for which there is a very low likelihood that the conditions will change while the data entry is propagating through the buffer.

At block 625, the predecoded retirement data is stored. In one embodiment, the predecoded retirement data is stored in the buffer with the corresponding data entry. In another embodiment, the predecoded retirement data may be stored in a different location with information associating the predecoded retirement data with the corresponding data entry.

While the data entry is pending in the buffer, monitoring of external events is performed. A determination is then made as to whether an external event necessitates modification of the predecoded retirement data stored in the buffer at decision 630. If it is necessary to modify the predecoded retirement data in the buffer, decision 630 branches to the "yes" branch whereupon, at block 635, the predecoded retirement data in the buffer is updated in accordance with the external event.

On the other hand, if no external event necessitates modification of the predecoded retirement data, decision 630 branches to the "no" branch, whereupon processing continuous at decision 638, bypassing block 635.

At decision 638, a determination is made as to whether the data entry is ready to be considered for retirement. If the entry is ready to be considered for retirement, decision 638 branches to the "yes" branch and continues to predefined process 640. At predefined process 640, a determination is made as to whether the data entry can be retired. More details on predefined process 640 are provided in FIGS. 7 and 9 and corresponding text, in which two alternative embodiments are described. Processing subsequently ends at 699.

On the other hand, if the entry is not ready to be considered for retirement, decision 638 branches to the "no" branch, whereupon processing loops back to decision 630. Processing subsequently ends at 699.

Figure 7:
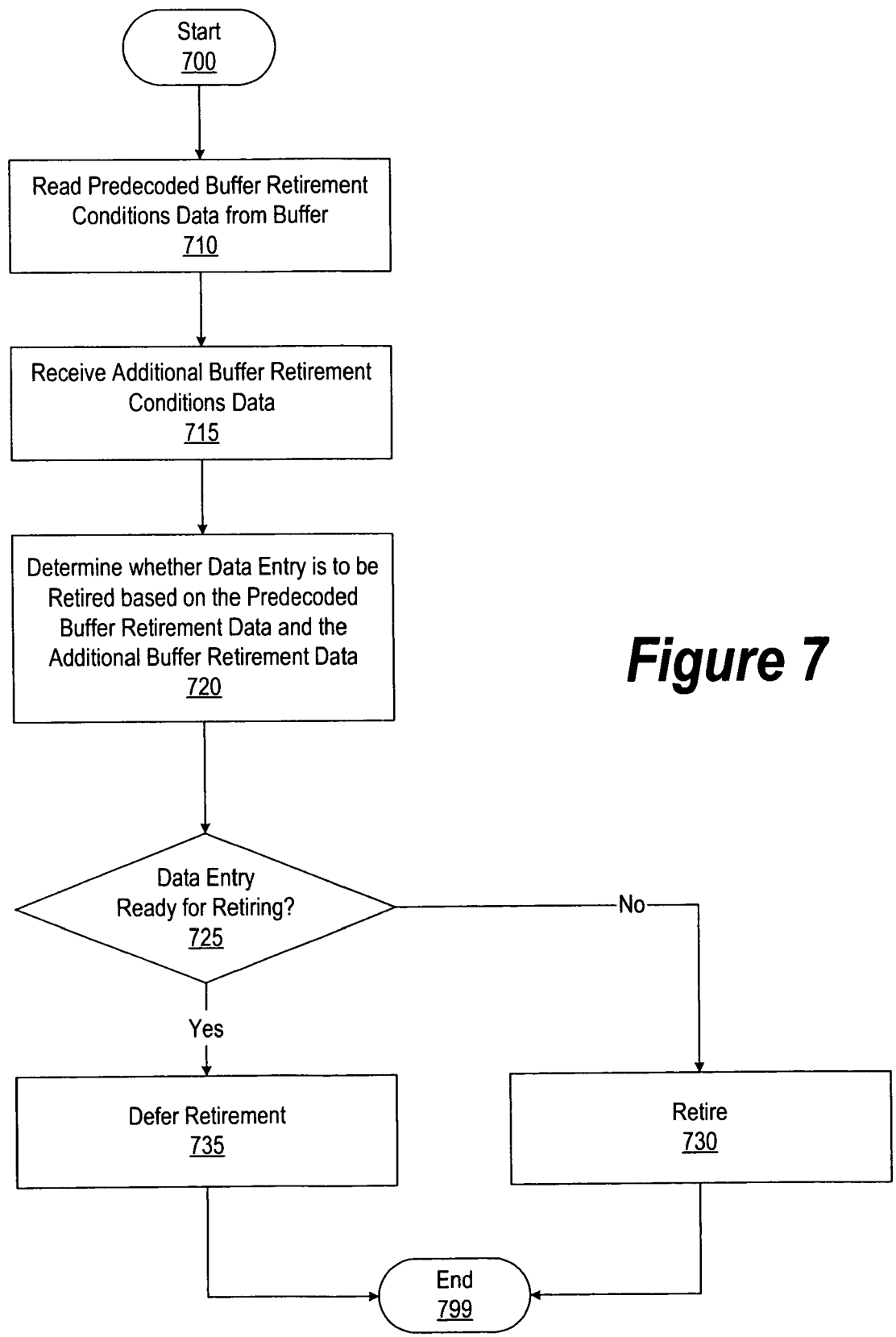
FIG. 7 is a flowchart illustrating a method for determining whether a data entry can be retired from a buffer in accordance with one embodiment.

Referring to FIG. 7, a flowchart illustrating a method for determining whether a data entry can be retired from a buffer in accordance with one embodiment is shown. Processing begins at 700 whereupon, at block 710, the predecoded buffer data retirement conditions data is read from the buffer (or other location where the data may be stored). At block 715, additional buffer data retirement conditions data is received.

At block 720, it is determined whether the data entry is to be retired based on the predecoded buffer data retirement conditions data, as well as on the additional buffer data retirement conditions data. A determination is then made as to whether the data entry can be retired at decision 725. If the data entry is ready for retirement, decision 725 branches to the "yes" branch whereupon, at block 735, the retirement for the data entry is deferred. Processing subsequently ends at 799.

If the data entry is not ready for retirement, decision 725 branches to the "no" branch whereupon, at block 730, the data entry is retired. Processing subsequently ends at 799.

Figure 8:
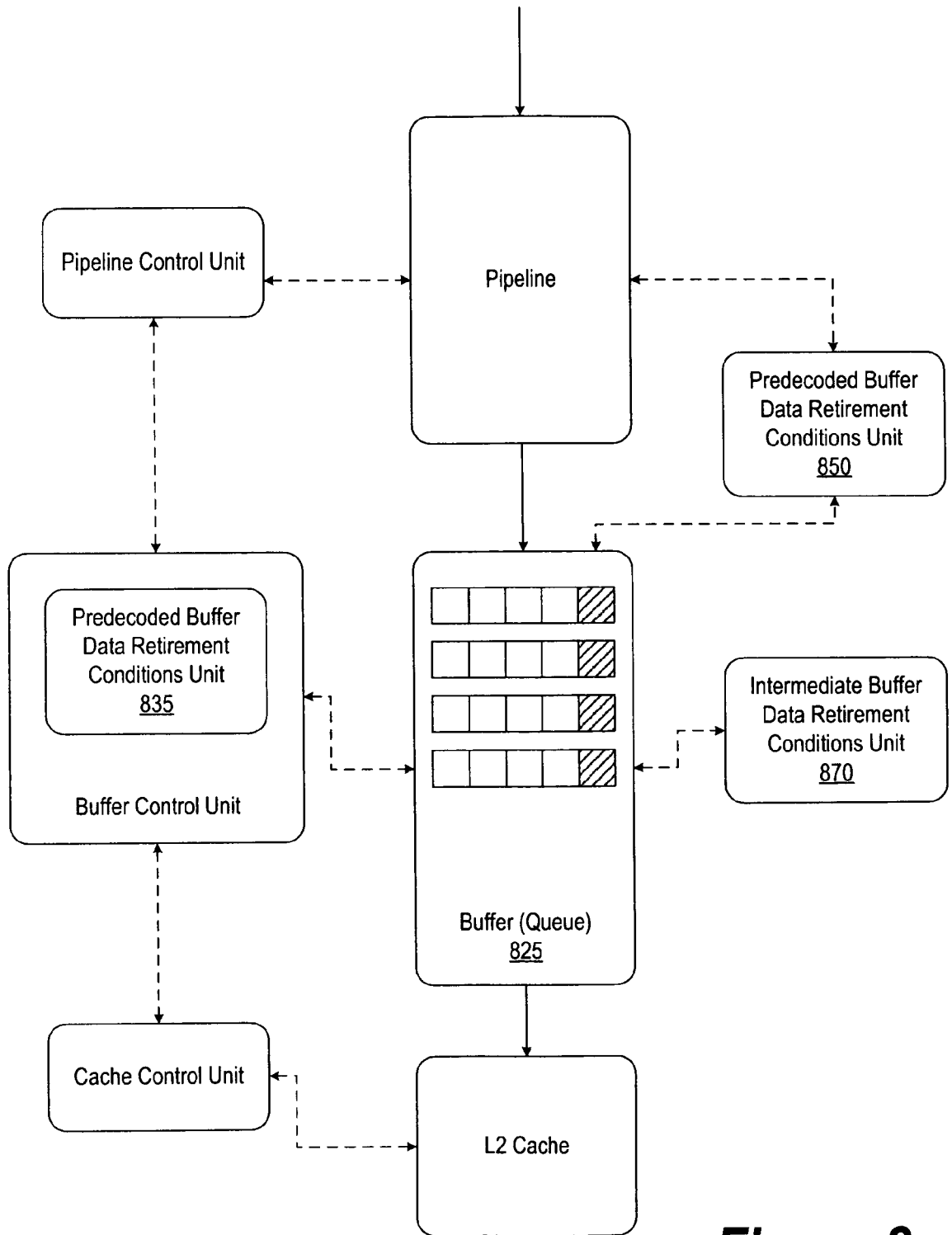
FIG. 8 is a block diagram illustrating a system configured to determine whether to retire data entries from a buffer based in part on information processed while the data entries are stored in the buffer in accordance with one embodiment.

Referring to FIG. 8, a block diagram illustrating a system configured to determine whether to retire data entries from a buffer based in part on information processed while the data entries are stored in the buffer in accordance with one embodiment is shown. In order to further enhance performance and reduce the time required to process data retirement information, intermediate buffer data retirement conditions unit 870 is introduced. This unit is configured to process additional retirement conditions while a data entry is propagating through the buffer.

In one embodiment, predecoded buffer data retirement conditions unit 850 may still process a portion of the retirement conditions, generate predecoded retirement information, and store that information in buffer 825. Buffer data retirement conditions unit 835 may still use this predecoded retirement information to determine whether to retire corresponding data entries. When the data entry is being considered for retirement, however, buffer data retirement conditions unit 835 also considers additional retirement information generated by intermediate buffer data retirement conditions unit 870 to determine whether the data entry is to be retired.

In one embodiment, intermediate buffer data retirement conditions unit 870 may operate on multiple entries in buffer 825 in parallel. This may allow additional processing time for each entry. In another embodiment, intermediate buffer data retirement conditions unit 870 and/or buffer 825 may be configured to enable certain bits of the predecoded data for one entry to propagate to another entry. This may make it possible to update the predecoded data for several data entries without having to recompute data from the same set of retirement condition inputs.

In alternative embodiments, other combinations of the buffer data retirement conditions units may be used to determine whether a data entry is to be retired. For example, buffer data retirement conditions unit 835 may be used with predecoded buffer data retirement conditions unit 850 alone or with intermediate buffer data retirement conditions unit 870 alone.

Figure 9:
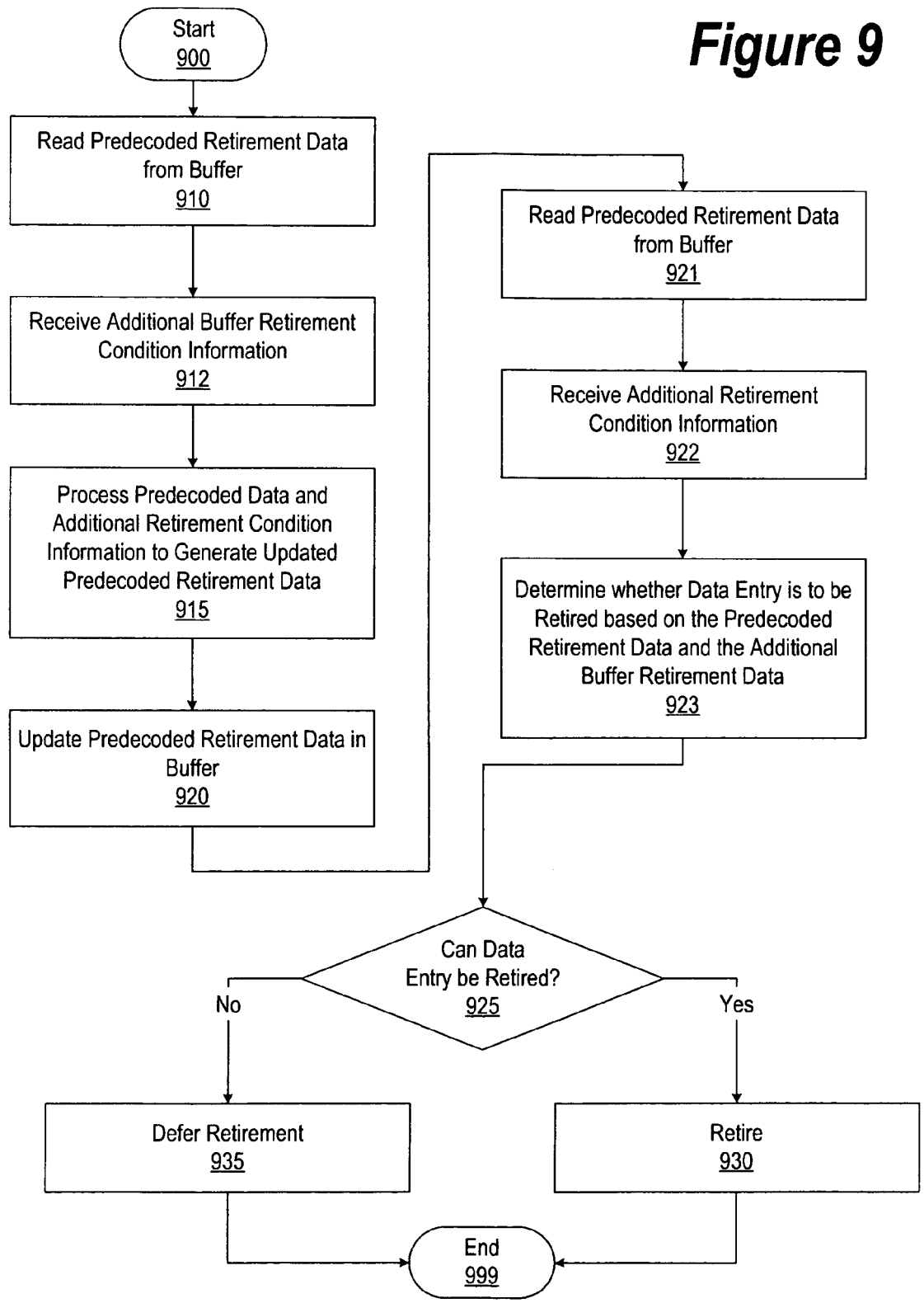
FIG. 9 is a flowchart illustrating a method for determining whether a data entry can be retired partially while the entry is stored in the buffer and partially before the entry is ready for retirement in accordance with one embodiment.

Referring to FIG. 9, a flowchart illustrating a method for determining whether a data entry can be retired from a buffer in accordance with an alternative embodiment is shown. In this embodiment, the retirement decision is based partially on predecoded data generated before the entry is stored in the buffer, and partially on processing of retirement condition information after the entry is stored in the buffer and before the entry is ready for retirement.

Processing begins at 900 whereupon, at block 910, the predecoded retirement data is read from the buffer (or oanther location where the data may be stored). At block 912, additional retirement condition data is received. At block 915, the predecoded data and the additional data are processed to generate updated predecoded retirement data. At block 920, the original predecoded retirement data is replaced with updated predecoded retirement data.

At some later time, the data entry is considered for retirement. At block 921, the predecoded retirement data is read from the buffer (or other location where the data may be stored). At block 922, additional retirement condition data is received. This retirement condition data is different from the retirement condition data processed at block 915. The retirement condition data received at block 922 may include dynamic information that is very likely to change up to the point at which the data entry is ready to be considered for retirement.

At block 923, it is determined whether the data entry is to be retired, based on the predecoded retirement condition data and the additional retirement condition data. A determination is then made as to whether the data entry can be retired at decision 925. If the data entry is ready for retirement, decision 925 branches to "yes" branch whereupon, at block 930, the data entry is retired. Processing subsequently ends at 999. If the data entry is not ready to be retired, decision 925 branches to the "no" branch whereupon, at block 935, the retirement for the data entry is deferred. Processing subsequently ends at 999.

It should be noted that, while the embodiments above are described in the context of processor queues (e.g., store queues, load miss queues, cache access queues, etc.,) alternative embodiments may be implemented in other types of buffers/queues in other types of systems. The need for preprocessing of queue entries as described above may simply be more pressing in the case of processors, since there is an ever-increasing demand to process data (and retire queue entries) more quickly. The invention, as recited in the following claims, should therefore be construed to include these alternative embodiments.

It should also be noted that, while certain embodiments described above (e.g., a store queue for a microprocessor) are intended to enable retirement with a particular frequency (e.g., one entry per clock cycle,) it may not be possible to accomplish this for every buffer entry. Therefore, in some embodiments, it may be necessary to relax such constraints for some buffer entries. For example, certain types of instructions that must take into account a greater number of retirement conditions than other types of instructions may be allowed to be retired from a microprocessor's store queue in two clock cycles instead of one.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as hardware (including computer systems,) software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

"Computer" and "computer system," as used herein, are intended to include any type of data processing system capable of performing the functions described herein. Such computers may make use of computer-readable media which may include any medium that can store software program instructions that can be executed by a computer, and includes floppy disks, hard disk drives, CD-ROMs, DVD-ROMs, RAM, ROM, DASD arrays, magnetic tapes, floppy diskettes, optical storage devices and the like.

The various illustrative logical blocks, modules, and circuits described in connection with the embodiments disclosed herein may be implemented or performed with general purpose processors, digital signal processors (DSPs), media processors, application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP, a media processor and a microprocessor, a plurality of microprocessors, one or more microprocessors in conjunction with a DSP core, a media processor or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system comprising:
    a buffer configured to receive data entries;
    predecode logic configured to:
        receive first information corresponding to a first set of retirement conditions for a data entry, and
        generate predecoded retirement information for the data entry based on the first information; and
    retire logic configured to:
        receive the predecoded retirement information and second information corresponding to a second set of retirement conditions for the data entry, and
        determine whether to retire the data entry based on the predecoded retirement information and the second information.

2. The system of claim 1, wherein the predecode logic is configured to generate the predecoded retirement information prior to storage of the data entry in the buffer.

3. The system of claim 2, wherein the predecoded retirement information is stored in the buffer with the data entry.

4. The system of claim 2, wherein the predecoded retirement information is stored in a memory location separate from the buffer and wherein the predecoded retirement information is stored with information indicating the association of the predecoded retirement information with the data entry.

5. The system of claim 1, further comprising external event processing logic configured to monitor one or more external events and to modify the predecoded retirement information in accordance with the external events.

6. The system of claim 5, wherein the one or more external events are selected from the group consisting of: snoop operations; updates of address translation information; and updates of data validity information.

7. The system of claim 1, wherein the predecode logic is configured to generate the predecoded retirement information after the data entry is stored in the buffer and before the data entry is considered for retirement.

8. The system of claim 1, wherein the predecode logic comprises:
    a first component that generates the predecoded retirement information based on a first subset of the first information prior to storage of the data entry in the buffer, and
    a second component that updates the predecoded retirement information based on a second subset of the first information after storage of the data entry in the buffer.

9. The system of claim 8, wherein the second component updates the predecoded retirement information based on the predecoded retirement information and the second subset of the first information after storage of the data entry in the buffer.

10. The system of claim 1, wherein the predecode logic comprises:
    a first component that generates a first component of the predecoded retirement information based on a first subset of the first information prior to storage of the data entry in the buffer, and
    a second component that generates a second component of the predecoded retirement information based on a second subset of the second information prior to storage of the data entry in the buffer.

11. The system of claim 1, wherein the buffer is chosen from the group consisting of: a store queue, a load queue, a lower memory access queue, a bus interface buffer, and an instruction issue buffer.

12. The system of claim 1, wherein the predecode logic comprises an intermediate component configured to update the stored predecoded retirement information based on intermediate information corresponding to an intermediate set of retirement conditions for a data entry, wherein the intermediate component is configured to update the stored predecoded retirement information for multiple buffer entries in parallel.

13. The system of claim 1, wherein the predecode logic comprises an intermediate component configured to update the stored predecoded retirement information based on intermediate information corresponding to an intermediate set of retirement conditions for a data entry, wherein the intermediate component is configured enable one or more bits of the stored predecoded retirement information for one buffer entry to propagate to another buffer entry.

14. A method comprising:
receiving a data entry for a buffer;
receiving first information corresponding to a first set of retirement conditions for the data entry;
generating predecoded retirement information for the data entry based on the first information;
receiving the predecoded retirement information and second information corresponding to a second set of retirement conditions for the data entry; and
determining whether to retire the data entry based on the predecoded retirement information and the second information.

15. The method of claim 14, further comprising storing the data entry in the buffer after the predecoded retirement information is generated.

16. The method of claim 15, wherein the predecoded retirement information is stored in the buffer with the data entry.

17. The method of claim 15, wherein the predecoded retirement information is stored in a location separate from the buffer, the method further comprising storing the predecoded retirement information with information indicating the association of the predecoded retirement information with the data entry.

18. The method of claim 14, further comprising:
receiving an external event, and
modifying the predecoded retirement information based on the external event.

19. The method of claim 18, wherein the external event is selected from the group consisting of: snoop operations; updates of address translation information; and updates of data validity information.

20. The method of claim 14, further comprising storing the data entry in the buffer before the predecoded retirement information is generated and considering the data entry for retirement after the predecoded retirement information is generated.

21. The method of claim 14, wherein generating the predecoded retirement information comprises generating the predecoded retirement information based on a first subset of the first information prior to storage of the data entry in the buffer and updating the predecoded retirement information based on a second subset of the first information after storage of the data entry in the buffer.

22. The method of claim 21, wherein updating the predecoded retirement information is based on the predecoded retirement information and the second subset of the first information.

23. The method of claim 14, wherein generating the predecoded retirement information comprises:
generating a first subset of the predecoded retirement information based on a first subset of the first information prior to storage of the data entry in the buffer, and
generating a second subset of the predecoded retirement information based on a second subset of the second information prior to storage of the data entry in the buffer.

24. The method of claim 14, wherein the buffer is chosen from the group consisting of: a store queue, a load queue, a lower memory access queue, a bus interface buffer, and an instruction issue buffer.

25. The method of claim 14, further comprising updating the stored predecoded retirement information for multiple data entries based on corresponding intermediate sets of retirement conditions, wherein the updating is performed in parallel for the multiple buffer entries.

26. The method of claim 14, further comprising updating the stored predecoded retirement information for multiple data entries based on corresponding intermediate sets of retirement conditions are propagating one or more bits of the stored predecoded retirement information for one buffer entry to another buffer entry.

* * * * *